(12) United States Patent
Laicher et al.

(10) Patent No.: US 8,392,908 B2
(45) Date of Patent: Mar. 5, 2013

(54) STANDARDIZED PROCEDURES FOR IMPLEMENTING SOFTWARE CHANGES

(75) Inventors: Karolin Laicher, Rauenberg (DE); Martin Helm, Bad Schonborn (DE)

(73) Assignee: SAP AG, Walldorf (DE)

(*) Notice: Subject to any disclaimer, the term of this patent is extended or adjusted under 35 U.S.C. 154(b) by 292 days.

(21) Appl. No.: 12/848,011

(22) Filed: Jul. 30, 2010

(65) Prior Publication Data

US 2012/0030666 A1 Feb. 2, 2012

(51) Int. Cl.
*G06F 9/445* (2006.01)

(52) U.S. Cl. ........ 717/172; 717/168; 717/169; 717/170; 717/171; 717/177

(58) Field of Classification Search .................. 717/172, 717/168, 169, 170, 171, 177, 121, 178; 709/223; 718/1
See application file for complete search history.

(56) References Cited

U.S. PATENT DOCUMENTS

| | | | |
|---|---|---|---|
| 7,831,637 B2 | 11/2010 | Sattler et al. | |
| 8,209,564 B2 | 6/2012 | Vidal et al. | |
| 8,239,851 B2 | 8/2012 | Laicher et al. | |
| 2006/0059253 A1* | 3/2006 | Goodman et al. | 709/223 |
| 2007/0157192 A1 | 7/2007 | Hoefler et al. | |
| 2008/0126110 A1 | 5/2008 | Haeberle et al. | |
| 2008/0184225 A1* | 7/2008 | Fitzgerald et al. | 718/1 |
| 2010/0023933 A1 | 1/2010 | Bryant et al. | |
| 2011/0113424 A1* | 5/2011 | Ewington et al. | 717/178 |
| 2011/0145807 A1* | 6/2011 | Molinie et al. | 717/170 |
| 2011/0209139 A1* | 8/2011 | Dominick et al. | 717/172 |
| 2011/0239189 A1* | 9/2011 | Attalla | 717/121 |
| 2011/0252412 A1* | 10/2011 | Sasaki | 717/168 |
| 2011/0296398 A1* | 12/2011 | Vidal et al. | 717/171 |
| 2011/0321031 A1* | 12/2011 | Dournov et al. | 717/171 |
| 2012/0030666 A1 | 2/2012 | Laicher et al. | |

* cited by examiner

*Primary Examiner* — Le H Luu
(74) *Attorney, Agent, or Firm* — Mintz Levin Cohn Ferris Glovsky and Popeo, P.C.

(57) ABSTRACT

A change to a tenant-independent content item identified as a target for changes as part of an update process of a core software platform provided by a multi-tenant system can be registered, and one or more customer tenants of the multi-tenant system can be analyzed to identify tenant-specific content items to which the registered change are relevant. A sequence can be established for processing a modification to the tenant-specific content item resulting from the registered change. The sequence can be based on at least one dependency of the tenant-specific content item on the tenant-independent content item affected by the registered change. Related articles and systems are also disclosed.

20 Claims, 6 Drawing Sheets

STANDARDIZED PROCEDURES FOR IMPLEMENTING SOFTWARE CHANGES

TECHNICAL FIELD

The subject matter described herein relates to procedures for implementing software changes, which can include version updates, "hot fixes," or the like, using standardized procedures.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

SUMMARY

In one aspect, a computer-implemented method includes registering a change to a tenant-independent content item identified as a target for changes as part of an update process of a core software platform provided by a multi-tenant system. The multi-tenant system includes an application server that provides access for each of a plurality of organizations to at least one of a plurality of customer tenants that comprise an organization-specific business configuration of the core software platform, The multi-tenant system also includes a data repository storing a plurality of tenant-independent content items relating to the operation of the core software platform that is common to all of the plurality of tenants and at least one tenant-specific content item that relate to the organization-specific business configuration and that is available to only one of the plurality of tenants. A tenant of the multi-tenant system is analyzed to identify a tenant-specific content item to which the registered change is relevant, and a sequence is established for processing a modification to the tenant-specific content item resulting from the registered change. The establishing of the sequence is based on at least one dependency of the tenant-specific content item on the tenant-independent content item affected by the registered change.

In some variations one or more of the following can optionally be included. The sequence can include forming a grouping comprising the modification to the at least one tenant-specific content item resulting from the registered change and a second modification to a second tenant-specific content item that also results from the registered change. The second tenant-specific content item can be part of a different tenant than the at least one tenant-specific content item. A second change to a second tenant-independent content item identified as a second target for changes can be registered as part of the update process of the core software platform, and a second grouping comprising additional modifications of tenant-specific content items that result from the second change can be formed. The grouping and a second grouping can be ordered in the sequence according to a number of tenant-specific content item modifications included in each of the grouping and the second grouping. The grouping can contain a larger number of tenant-specific content item modifications than the second grouping and the ordering comprises executing the grouping before the second grouping. The sequence can include a series that includes at least two tasks. The sequence can be executed in parallel for each of at least two of the plurality of tenants. The executing of the sequence for each of the at least two tenants can include initiating execution of a succeeding task of the at least two tasks on a first tenant of the at least two tenants upon completion of a preceding task of the at least two tasks for that specific tenant irrespective of whether the preceding task has completed on a second tenant of the at least two tenants.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, a standardized procedure can be provided for applying updates and corrections to a multi-tenant software delivery system. Updates and corrections to the core software package can be performed using a common, standardized process pattern that provides improved update and correction processes with regards to monitoring of the update and correction process and more accurately predicting completion times.

It should be noted that, while the descriptions of specific implementations of the current subject matter discuss delivery of enterprise resource planning software to multiple organizations via a multi-tenant system, the current subject matter is applicable to other types of software and data services access as well. Furthermore, all discussions of possible user interface interactions in the following description of various implementations of the current subject matter are intended to be merely illustrative and completely non-limiting. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 1:
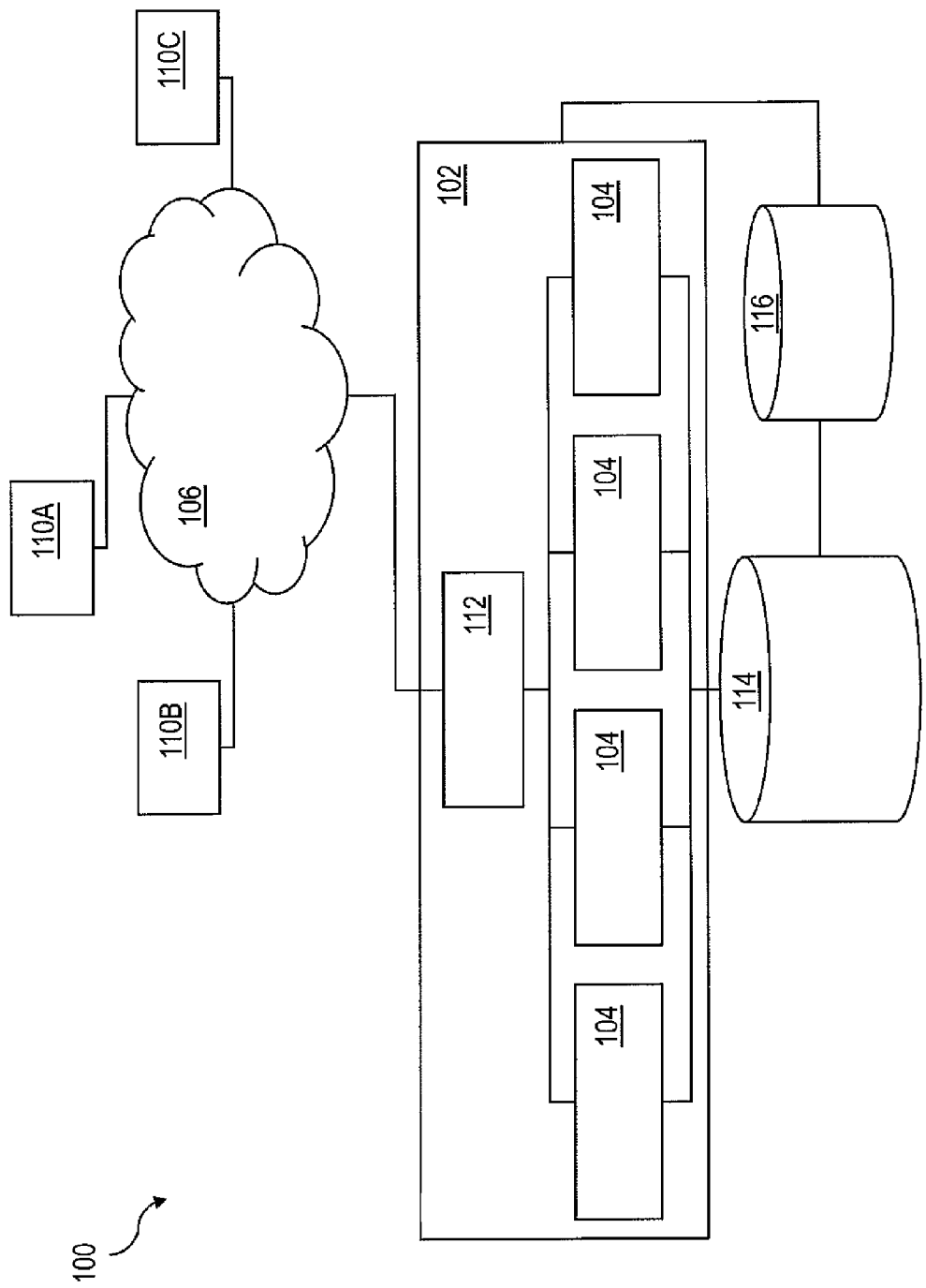
FIG. 1 is a diagram showing an example of a multi-tenant approach to providing customized software services to multiple organizations from a single architecture.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant system) supported by a single software delivery architecture 100. One example of such a software delivery architecture can include features similar to those of the Business ByDesign™ software available from SAP AG (Walldorf, Germany). For a system in which the application server 102 includes multiple server systems 104, the application server can include a load balancer 112 to distribute requests and actions from users at the one or more organizations 110A-110C to the one or more server systems 104. A user can access the software delivery architecture across the network using a thin client, such as for example a web browser or the like, or other portal software running on a client machine. The application server 102 can access data and data objects stored in one or more data repositories 114.

Figure 2:
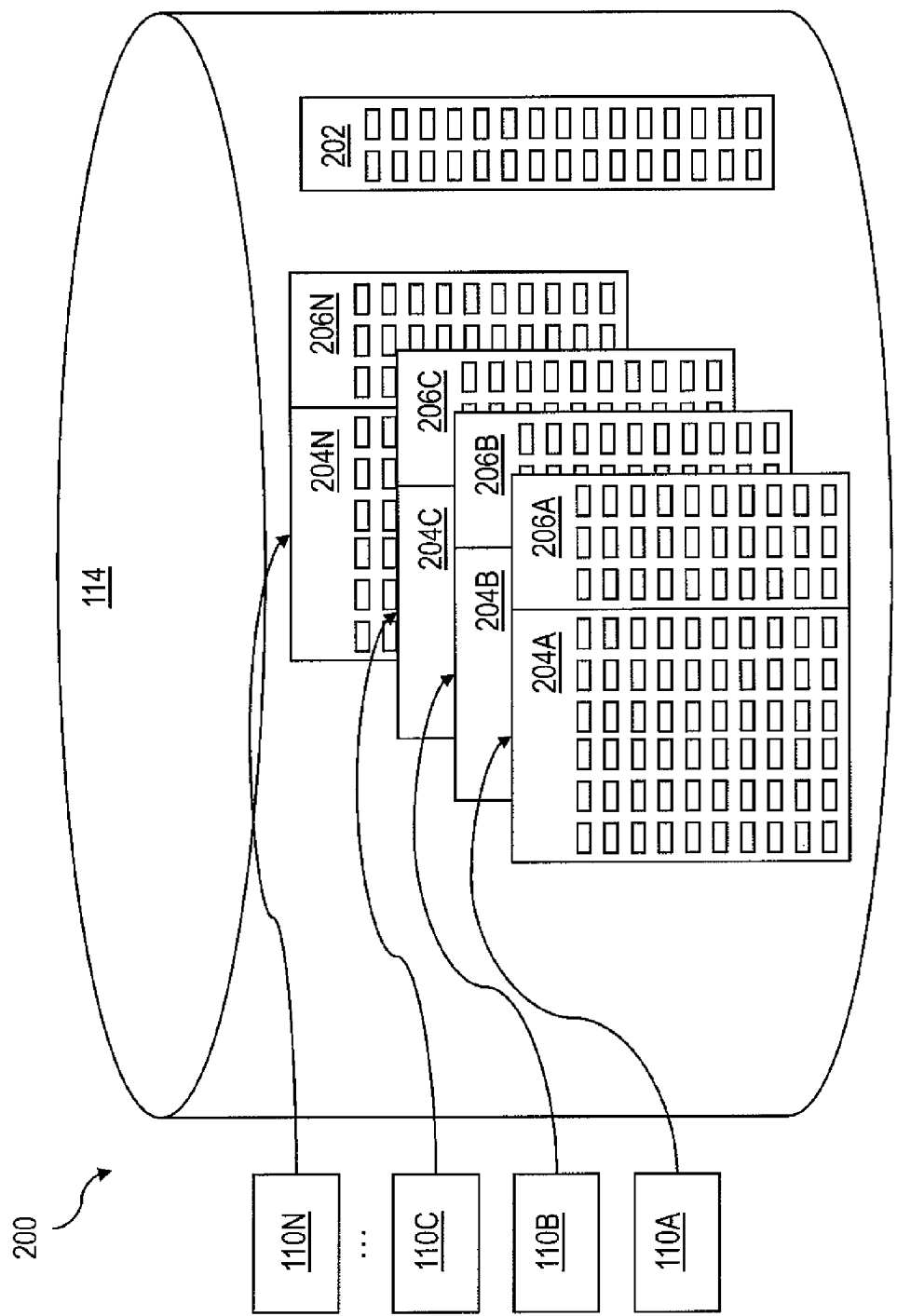
FIG. 2 is a diagram showing storage of both core software package data objects and tenant-specific data objects for each of multiple tenants of a multi-tenant system.

To provide for customization of the core software platform for each of multiple organizations supported by a single software delivery architecture 100, the data and data objects stored in the repository or repositories 114 that are accessed by the application server 102 can include three types of content as shown in FIG. 2: core software platform content 202, system content 204, and tenant-specific content 206. Core software platform content 202 includes content that represents core functionality and is not modifiable by a tenant. System content 204 can in some examples be created by the runtime of the core software platform and can include core data objects that are modifiable with data provided by each tenant. For example, if the core software platform is an ERP system that includes inventory tracking functionality, the system content 204A-204N can include data objects for labeling and quantifying inventory. The data retained in these data objects are tenant-specific: for example, each tenant 110A-110N stores information about its own inventory. Tenant-specific content 206A-206N includes data objects or extensions to other data objects that are customized for one specific tenant 110A-110N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant-specific content 206 can include condition records in generated condition tables, access sequences, price calculation results, or any other tenant-specific values. A combination of the software platform content 202 and system content 204 and tenant-specific content 206 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 104 that handle processing loads distributed by a load balancer 112. Potential benefits from such an arrangement can include, but are not limited to, high and reliably continuous application server availability and minimization of unplanned downtime, phased updating of the multiple server systems 104 to permit continuous availability (one server system 104 can be taken offline while the other systems continue to provide services via the load balancer 112), scalability via addition or removal of a server system 104 that is accessed via the load balancer 112, and de-coupled lifecycle processes (such as for example system maintenance, software upgrades, etc.) that enable updating of the core software independently of tenant-specific customizations implemented by individual tenants.

Figure 3:
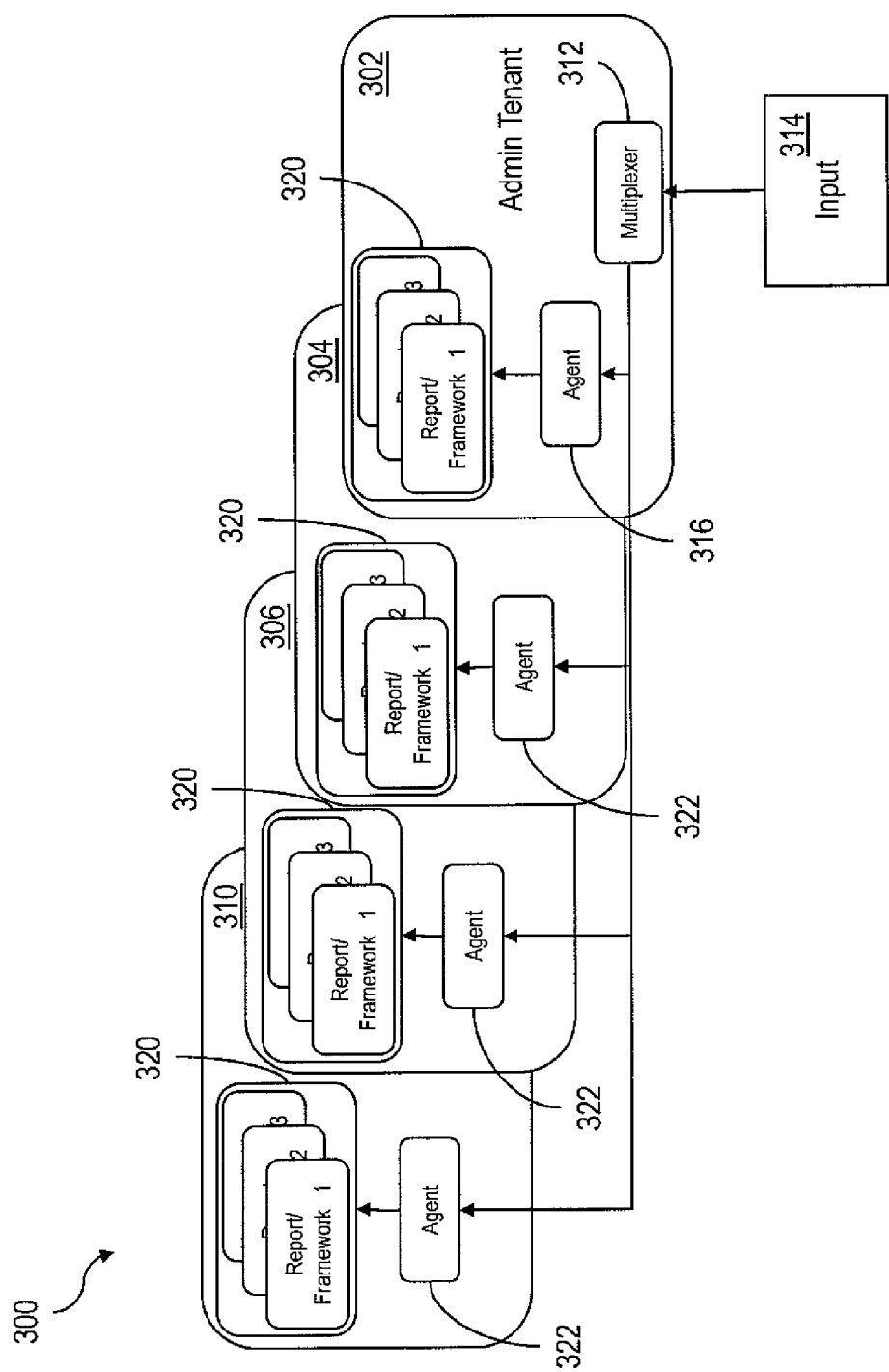
FIG. 3 is a diagram showing operation of a tenant multiplexer.
Figure 4:
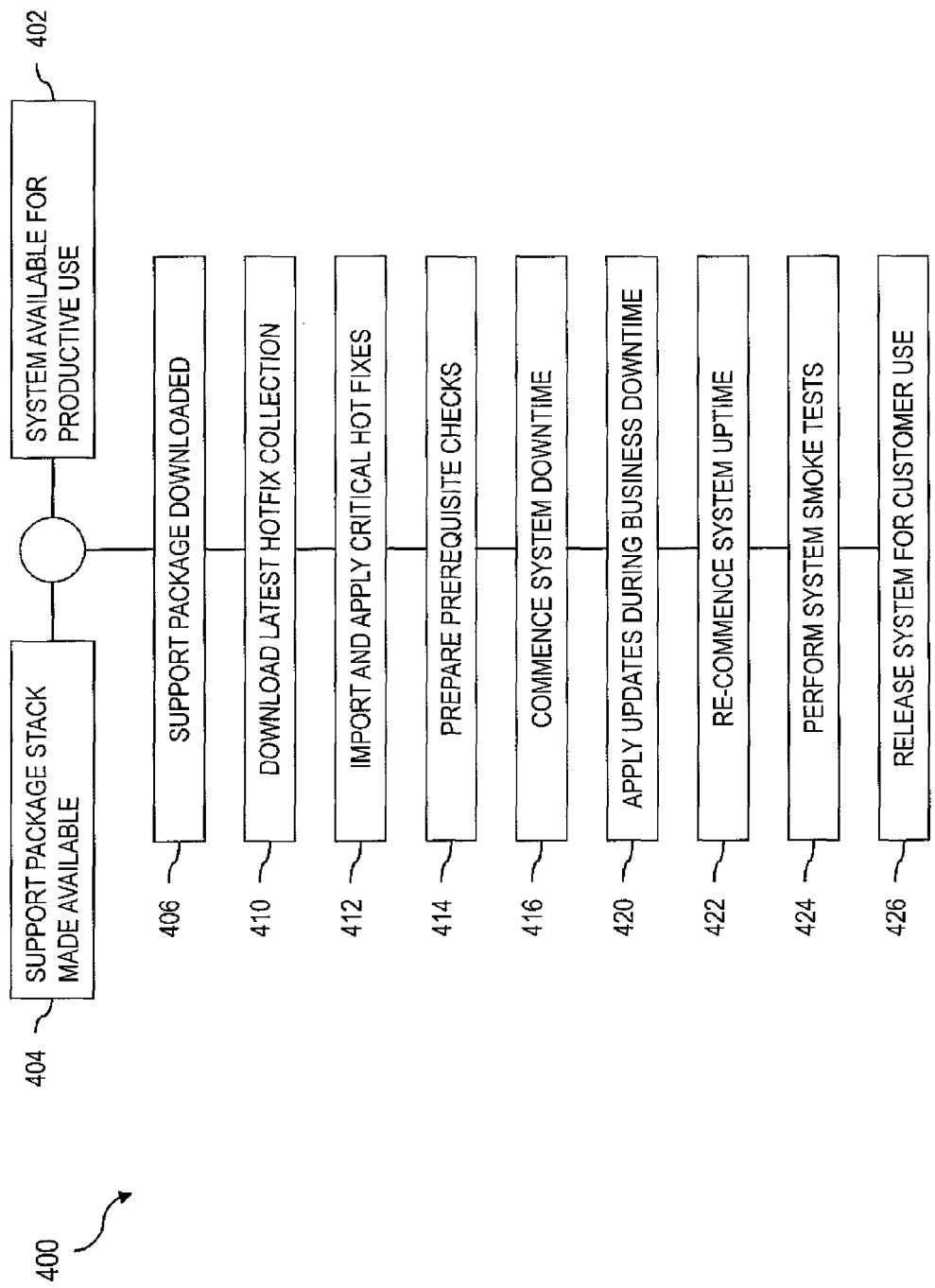
FIG. 4 is a process flow diagram illustrating a process of implementing system updates.

FIG. 3 shows a box diagram 300 of multiple tenants in a multi-tenant software architecture, such as that show in FIG. 1 and FIG. 2. An administrative tenant 302 is included in the software architecture along with the plurality of customer tenants 304, 306, and 310. It should be readily understood that while FIG. 3 shows 3 customer tenants, this should not be construed as limiting the actual number of tenants in a system consistent with an implementation of the current subject matter. A tenant multiplexer 312 at the administrative tenant 302 receives input 314, for example instructions for software upgrades, a report format to be run for each tenant in the multi-tenant software architecture, or the like. The input 314 can specify that the required operations are to be processed for all tenants (both administrative and customer), for the administrative tenant 302 and some subset of the customer tenants, for just the customer tenants or some subset thereof, or for only the administrative tenant. The multiplexer can then call an administrative tenant agent 316, which calls one or more of a set 320 of reports, modification frameworks, or other procedures or architectures for implementing the operations required by the input 314. If the input 314 specifies that all or some subset of the customer tenants are to be operated upon, the multiplexer 312 accesses the designated customer tenants via a trusted connection that does not require use of normal authentication procedures like user names and passwords. In one example, the multiplexer accesses the designated customer tenants via a remote function call (RFC). Via the trusted connection, the multiplexer 312 passes the set 320 of reports, modification frameworks, or other procedures or architectures for implementing the operations required by the input 314 to a tenant agent 322 at each customer tenant.

Making modifications to the core software platform, for example updating to a new version, implementing a change to the core functionality, or the like, can become a complicated and unpredictable process if each tenant's customized data objects and other tenant-specific configurations do not react in the same manner to the modifications. Additionally, during a lifecycle management (LM) event, such as for example an upgrade or update, many application specific actions, tasks, or the like, which are hereinafter referred to as LM actions, may have to be executed in a multi-tenant system. One or more of these LM actions have to run on every business tenant that exists in the multi-tenant system. Co-pending and co-owned application Ser. No. 12/847,919 (entitled "MULTI-PLEXER FOR MULTI-TENANT ARCHITECTURES"), the disclosure of which is incorporated herein by reference in its entirety, describes one possible approach by which lifecycle management tasks or events can be initiated in parallel on multiple tenants of multi-tenant system.

Applying updates, changes, hot fixes, or the like (hereinafter referred to as "updates") to any aspect of the provided software solution or to the infrastructures supporting delivery of the software solution can require that access to the software solution by end users be suspended for a period of time that is commonly referred to as downtime. Minimization of downtime is very desirable in nearly any software installation, especially if the software provides one or more business critical functions. When updates are required, they are often scheduled for times when the downtime will have the smallest possible impact on the organization, for example over a weekend, at night, or during some other period when as few as possible users associated with the organization are expected to be attempting to access software features or data. The downtime required for an update generally varies depending on the content of the update, and in a multi-tenant system can also depend strongly upon dependencies between core software platform content 202, system content 204, and tenant-specific content 206. As an example, applying an update for a tenant whose installation includes numerous and complicated customizations and extensions that depend upon a large number of core software data objects and the like can require substantially longer downtime than a similar software change, update, or correction for a tenant whose installation lacks as much complexity and interdependency on standard data objects of the core software package.

Infrastructures that might need to be updated can include meta data repository frameworks, such as for example MDRS and xRepository. Both a meta data repository framework as well as the contents of such a framework can be fully integrated into design time. Changes can be delivered as part of a main interface software component, that can in some implementations be provided in the advanced business application programming (ABAP) language, as is for example Business ByDesign™ available from SAP AG (Walldorf, Germany). Such changes can be applied using one or more software deployment tools, such as service provisioning and account management (SPAM), which can in some examples be implemented in an ABAP environment.

Lifecycle management events can include one or more phases of actions to be performed in each of the customer tenants of the multi-tenant system and can result in transitioning the multi-tenant system and all of its customer tenants from a current state or version to a target state or version. Such lifecycle management events can include, but are not limited to, business configuration (BC) deployments, application-to-application (A2A) regeneration, or Fast Search Infrastructure (FSI) loads. A multiplexer 312, such as for example that shown in FIG. 3, can be used to start and monitor the actions required to implement desired lifecycle management events synchronously for all tenants and to propagate the protocols into a single protocol. However, after such LM actions are initiated, a further issue can arise with monitoring progress of the LM actions across the multiple customer tenants. As each customer tenant can include customer-specific extensions that can include dependencies on core software features, data, data objects, and the like, the progression of LM actions may not proceed at the same rate or even with success across all customer tenants in the multi-tenant system.

With a large number of LM actions being performed in parallel across a large number of customer tenants, analyzing and/or finding solutions to errors, faults, interruptions, or the like to the process of executing the LM actions can be very labor intensive. Additionally, if multiple sequential LM actions are to be performed, an error causing an interruption or delay for even one customer tenant can cause the entire process to be interrupted for all customer tenants unless a procedure or framework is provided to allow isolation and analysis of customer tenants experiencing erroneous execution of an LM action independent of the progression of executing subsequent LM actions for customer tenants that have not experienced an error or interruption.

To complete the transition process from the current state or version of the core software platform to the target state, the transition is advantageously applied to each customer tenant. This transition process can include both tenant independent steps or actions and tenant dependent steps or actions. Tenant-independent steps or actions can include, but are not limited to, changes, modifications, upgrades, etc. to the core software platform and to business objects that are not tenant modifiable. Tenant-dependent steps or actions can include, but are not limited to business configuration features including data and data objects, and fast search infrastructure loads, which can be customized for the organization assigned to each customer tenant. Each customer tenant can have its own business configuration, data, which has to be loaded into the FSI.

In the interest of providing a more robust and predictable process for applying updates across multiple tenants of a multi-tenant system such as that discussed above, an update procedure such as that discussed in the following paragraphs can be applied.

Prior to commencement of the update procedure, at 402 the system can be available for productive use by all tenants of the multi-tenant system. The multi-tenant system can be scheduled for an update, for example according to maintenance contract conditions, a necessary upgrade or correction, or some other reason. At 404, a support package stack (SPS) can be made available to the system. One or more release preconditions can be fulfilled, such as for example the update can have been successfully validated in an environment that simulates a customer's productive use arrangement, a set of required meta data can be available, a set of automatically or manually implementable pre- and/or post deployment steps can have been defined, or the like. At 406, the support package can be downloaded to the system. The downloading can occur form one or more service providers, which can be the core software platform provider and/or one or more providers of third party functionality that can be integrated into the customized software solution provided to one or more of the client organizations via the multi-tenant system.

A set or collection of hot fixes or other more limited updates or corrections can also be downloaded at 410 and prepared for application to the system. This can include downloading of a set of required support package patches from a service marketplace, repository, or the like or verifying that a set of required support packages are available in a local or global download directory or the like. At 412, critical hot fixes can be imported and applied to the multi-tenant system. Such critical patches can be specifically flagged among all of the scheduled hot fixes. In a system based on the Advanced Business Application Programming (ABAP) language (available from SAP AG of Walldorf, Germany), critical hot fixes can be applied up to the latest available update. For systems that are not based on ABAP, critical hot fixes of the latest update can be applied. One or more prerequisite checks can be prepared at 414. An update can be prepared, for example during business uptime, by building up a deployment queue and executing relevant checks (if such are required). All steps executed during the business uptime can be reversible. Once a business uptime has started, the system can be locked for other changes, such as for example business configuration deployment.

System downtime can be commenced at 416, for example according to a system maintenance window. In some variations, all tenants in a system can share a same maintenance window. During downtime, all tenants of the system are not accessible anymore for business usage. During the system downtime, at 420 the updates can be applied. This can include all pre- and/or post-processing steps in addition to the actual software archive deployment. These actions can in some examples only be rolled back by restoring the system to the very beginning of the business downtime. After application of the updates is completed, system uptime can be recommenced at 422. However customer access can remain blocked at this stage, for example via display of a static maintenance page.

One or more technical "smoke tests" can be executed and interpreted by a customer service or other support organization at 424 to determine whether the system is ready for end user productive use. Such a customer service organization or the like can approve system readiness and can be a prerequisite for system handover to affected customers. At 426, upon completion of the smoke tests, the system can be released for productive use by the customer, for example by switching the UI from a static maintenance page back to a standard UI for productive use.

Figure 5:
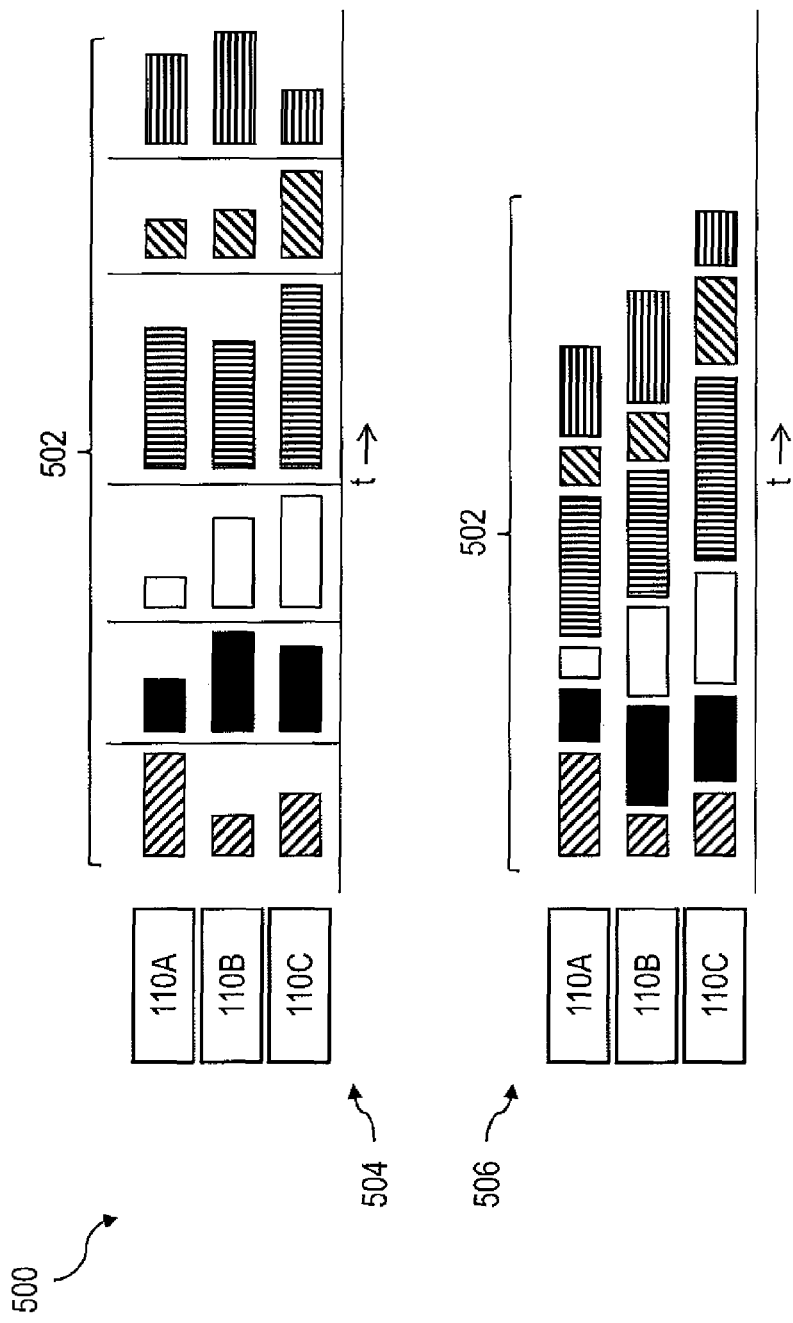
FIG. 5 is a diagram showing alternative approaches to scheduling of a sequence of tasks, reports, or the like to be executed on multiple affected tenants of a multi-tenant system.

The procedure employed at item 420 when the necessary updates are applied can be improved using one or more aspects of the current subject matter. FIG. 5 compares two approaches to scheduling a series of tasks, reports, or the like 502 (referred to as task for the remainder of this paragraph) that are to be sequentially executed for each multiple tenants 110A, 110B, 110C of a multi-tenant system. A parallel run procedure as shown in the upper panel 504 of FIG. 5 in which each task 502 in the sequence is not started until the preceding task 502 has completed for all of the affected tenants 110A, 110B, 110C can lead to a substantially longer total runtime, particularly if there are substantial differences in the run time required for each of the affected tenants 110A, 110B, 110C for one or more of the tasks 502. An improved total run tine for the sequence can be achieved by starting the next task 502 in the sequence for each of the affected tenants 110A, 110B, 110C immediately after completion of the preceding task in the sequence irrespective of the execution state in other affected tenants 110A, 110B, 110C. An example of this approach is shown in the lower panel 506 of FIG. 5.

Figure 6:
FIG. 6 is a process flow diagram illustrating a method consistent with an implementation of the current subject matter.

The process flow chart 600 of FIG. 6 shows one implementation of an approach consistent with the current subject matter. The updates to be applied can be analyzed and used to define the sequence in which those updates are applied. Using knowledge that is retained, for example in an associations repository 116, each update scheduled for execution during the system downtime can be parsed or otherwise classified according to data objects or business objects related to the core software platform that are to be affected. Changes to tenant-independent content identified as being targeted for changes or otherwise affected by the update process can be registered at 602. This registration can include both "what" is to be updated (i.e. the specific change to be made) and "where" the updates will have an effect (i.e. which objects are affected). Put another way, changes to the tenant-independent content (which can include core software platform content 202 and system content 204) required by the updates are registered. At 604, a customer tenant of the multi-tenant system undergoing the updates can be analyzed to determine whether the registered changes are relevant to that customer tenant. This analysis can include consulting the association repository 116 or, alternatively, performing a real-time analysis of the content repository 114, to examine tenant-specific content 206 of the specific customer tenant to identify whether the customer tenant includes one or more extensions or customizations that have dependencies on objects in the tenant-independent content that have been registered as being affected by the updates. At 606, a sequence is established for processing the changes required to the tenant-specific content 206 based on dependencies of objects, extensions, customizations, and other data structures of the tenant-specific content 206 on objects, etc. of the tenant-independent content 202 and 204 being changed by the updates.

Such a sequence can include groupings of changes to the tenant-specific content 206 that are based on common associations. For example, all features of the tenant-specific content having dependencies on the same tenant-independent content can be modified in one grouping such that a status check can be executed after the modifications to the grouping are complete and before a next grouping of modifications is commenced. Furthermore, the ordering of the application of the modification groupings can be established such that the modifications proceed in order of declining number of dependencies of tenant-specific content upon a given part of the tenant-independent content. For example, an object or the like of the tenant-independent content having a largest amount of tenant-specific content with dependencies upon it can be identified and the grouping of modifications to the tenant-specific content 206 having those dependencies can be processed first, followed by a second grouping of modifications to the tenant-specific content 206 having dependencies upon a second object or the like of the tenant-independent content having a second largest amount of tenant-specific content with dependencies thereupon, and so forth.

In this manner, the propagation of modifications to the tenant-specific content 206 of a customer tenant can be performed in a logical and controlled sequence with the ability to verify successful implementation of modifications to the tenant-specific content based on the range of tenant-independent content changes necessitated by the updates. The above-described procedure can be applied across all tenants of the multi-tenant system such that the tenant-specific content 206 of all of the customer tenants 110 in the system can be analyzed to identify dependencies on the tenant-independent content being affected by the updates. Then, the propagation of the modifications to the tenant-specific content can proceed across all customer tenants according to the groupings of modifications. Using such a procedure, potential problems caused by the updates can be rapidly identified as either global (i.e. affecting multiple or even all customer tenants 110 of the system) or localized (i.e. affecting only one or a few customer tenants 110). Corrections of problems identified using this standardized procedure can be made much easier if a troubleshooter can rapidly identify a grouping of tenant-specific modifications in which the error or errors originated. From this identification, the underlying tenant-independent content upon which the grouping of modifications depends can be rapidly isolated and analyzed to determine whether the observed problems are related to an issue with the updates to the tenant-independent content or to issues with the tenant-specific dependencies implemented to create the customized software solutions offered to one or more organizations through their corresponding customer tenants 110.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a machine-readable medium storing instructions that, when executed by at least one processor, cause the at least one processor to perform operations comprising:

registering a change to a tenant-independent content item identified as a target for changes as part of an update process of a core software platform provided by a multi-tenant system, the multi-tenant system comprising an application server and a data repository, the application server providing access for each of a plurality of organizations to at least one of a plurality of customer tenants, each of the plurality of tenants comprising an organization-specific business configuration of the core software platform, the data repository storing a plurality of tenant-independent content items relating to the operation of the core software platform that is common to all of the plurality of tenants and at least one tenant-specific content item that relate to the organization-specific business configuration and that is available to only one of the plurality of tenants;

analyzing a tenant of the multi-tenant system to identify a tenant-specific content item to which the registered change is relevant; and establishing a sequence for processing a modification to the tenant-specific content item resulting from the registered change, the establishing of the sequence being based on at least one dependency of the tenant-specific content item on the tenant-independent content item affected by the registered change.

2. A computer program product as in claim 1, wherein the sequence comprises forming a grouping comprising the modification to the at least one tenant-specific content item resulting from the registered change and a second modification to a second tenant-specific content item that also results from the registered change.

3. A computer program product as in claim 2, wherein the second tenant-specific content item is part of a different tenant than the at least one tenant-specific content item.

4. A computer program product as in claim 2, wherein the operations further comprise:

registering a second change to a second tenant-independent content item identified as a second target for changes as part of the update process of the core software platform; and forming a second grouping comprising additional modifications of tenant-specific content items that result from the second change.

5. A computer program product as in claim 4, wherein the operations further comprise: ordering the grouping and a second grouping in the sequence according to a number of tenant-specific content item modifications included in each of the grouping and the second grouping.

6. A computer program product as in claim 5, wherein the grouping contains a larger number of tenant-specific content item modifications than the second grouping and the ordering comprises executing the grouping before the second grouping.

7. A computer program product as in claim 2, wherein the sequence comprises a series comprising at least two tasks, and wherein the operations further comprises executing the sequence in parallel for each of at least two of the plurality of tenants, the executing of the sequence for each of the at least two tenants comprising initiating execution of a succeeding task of the at least two tasks on a first tenant of the at least two tenants upon completion of a preceding task of the at least two tasks for that specific tenant irrespective of whether the preceding task has completed on a second tenant of the at least two tenants.

8. A system comprising:

at least one processor; and a machine-readable medium storing instructions that, when executed by the at least one processor, cause the at least one processor to perform operations comprising:

registering a change to a tenant-independent content item identified as a target for changes as part of an update process of a core software platform provided by a multi-tenant system, the multi-tenant system comprising an application server and a data repository, the application server providing access for each of a plurality of organizations to at least one of a plurality of customer tenants, each of the plurality of tenants comprising an organization-specific business configuration of the core software platform, the data repository storing a plurality of tenant-independent content items relating to the operation of the core software platform that is common to all of the plurality of tenants and at least one tenant-specific content item that relate to the organization-specific business configuration and that is available to only one of the plurality of tenants;

analyzing a tenant of the multi-tenant system to identify a tenant-specific content item to which the registered change is relevant; and establishing a sequence for processing a modification to the tenant-specific content item resulting from the registered change, the establishing of the sequence being based on at least one dependency of the tenant-specific content item on the tenant-independent content item affected by the registered change.

9. A system as in claim 8, wherein the sequence comprises forming a grouping comprising the modification to the at least one tenant-specific content item resulting from the registered change and a second modification to a second tenant-specific content item that also results from the registered change.

10. A system as in claim 9, wherein the second tenant-specific content item is part of a different tenant than the at least one tenant-specific content item.

11. A system as in claim 9, wherein the operations further comprise:

registering a second change to a second tenant-independent content item identified as a second target for changes as part of the update process of the core software platform; and forming a second grouping comprising additional modifications of tenant-specific content items that result from the second change.

12. A system as in claim 11, wherein the operations further comprise: ordering the grouping and a second grouping in the sequence according to a number of tenant-specific content item modifications included in each of the grouping and the second grouping.

13. A system as in claim 12, wherein the grouping contains a larger number of tenant-specific content item modifications than the second grouping and the ordering comprises executing the grouping before the second grouping.

14. A system as in claim 9, wherein the sequence comprises a series comprising at least two tasks, and wherein the operations further comprises executing the sequence in parallel for each of at least two of the plurality of tenants, the executing of the sequence for each of the at least two tenants comprising initiating execution of a succeeding task of the at least two tasks on a first tenant of the at least two tenants upon completion of a preceding task of the at least two tasks for that specific tenant irrespective of whether the preceding task has completed on a second tenant of the at least two tenants.

15. A computer-implemented method comprising:

registering a change to a tenant-independent content item identified as a target for changes as part of an update process of a core software platform provided by a multi-tenant system, the multi-tenant system comprising an application server and a data repository, the application server providing access for each of a plurality of organizations to at least one of a plurality of customer tenants, each of the plurality of tenants comprising an organization-specific business configuration of the core software platform, the data repository storing a plurality of tenant-independent content items relating to the operation of the core software platform that is common to all of the plurality of tenants and at least one tenant-specific content item that relate to the organization-specific business configuration and that is available to only one of the plurality of tenants;

analyzing a tenant of the multi-tenant system to identify a tenant-specific content item to which the registered change is relevant; and establishing a sequence for processing a modification to the tenant-specific content item resulting from the registered change, the establishing of the sequence being based on at least one dependency of the tenant-specific content item on the tenant-independent content item affected by the registered change.

16. A computer-implemented method as in claim 15, wherein the sequence comprises forming a grouping comprising the modification to the at least one tenant-specific content item resulting from the registered change and a second modification to a second tenant-specific content item that also results from the registered change.

17. A computer-implemented method as in claim 16, wherein the second tenant-specific content item is part of a different tenant than the at least one tenant-specific content item.

18. A computer-implemented method as in claim 16, further comprising:

registering a second change to a second tenant-independent content item identified as a second target for changes as part of the update process of the core software platform; and forming a second grouping comprising additional modifications of tenant-specific content items that result from the second change.

19. A computer-implemented method as in claim 18, further comprising: ordering the grouping and a second grouping in the sequence according to a number of tenant-specific content item modifications included in each of the grouping and the second grouping.

20. A computer-implemented method as in claim 19, wherein the grouping contains a larger number of tenant-specific content item modifications than the second grouping and the ordering comprises executing the grouping before the second grouping.

* * * * *